US006288706B1

(12) United States Patent
Leman

(10) Patent No.: US 6,288,706 B1
(45) Date of Patent: Sep. 11, 2001

(54) METHOD FOR OPERATING AN ERGONOMIC KEYBOARD

(75) Inventor: Michael Leman, Eagle, ID (US)

(73) Assignee: Micron Technology, Inc., Boise, ID (US)

(*) Notice: Subject to any disclaimer, the term of this patent is extended or adjusted under 35 U.S.C. 154(b) by 0 days.

(21) Appl. No.: 09/104,941

(22) Filed: Jun. 25, 1998

(51) Int. Cl.[7] .................................................. G09G 5/00
(52) U.S. Cl. ............................ 345/168; 345/169; 341/22
(58) Field of Search .................................. 345/168, 167, 345/160, 157; 341/22

(56) References Cited

U.S. PATENT DOCUMENTS

| D. 306,433 | 3/1990 | Mitchell ............................... D14/106 |
| 3,940,758 | 2/1976 | Margolin ............................... 340/337 |
| 4,378,553 | 3/1983 | McCall ............................... 340/365 R |
| 4,509,873 | 4/1985 | Ryan ............................... 400/489 |
| 4,517,660 | 5/1985 | Fushimoto et al. ............................... 364/708 |
| 4,661,005 | 4/1987 | Lahr ............................... 400/489 |
| 4,736,191 | * 4/1988 | Matzke et al. ............................... 345/173 |
| 4,739,451 | 4/1988 | Kuba ............................... 361/394 |
| 4,839,837 | 6/1989 | Chang ............................... 364/708 |
| 4,852,498 | 8/1989 | Judd ............................... 108/43 |
| 5,067,834 | 11/1991 | Szmanda et al. ............................... 400/489 |
| 5,073,050 | 12/1991 | Andrews ............................... 400/82 |
| 5,137,384 | 8/1992 | Spencer et al. ............................... 400/489 |
| 5,187,644 | 2/1993 | Crisan ............................... 361/393 |
| 5,220,521 | 6/1993 | Kikinis . |
| 5,228,791 | 7/1993 | Fort ............................... 400/489 |
| 5,278,779 | * 1/1994 | Conway et al. ............................... 345/168 |
| 5,351,066 | 9/1994 | Rucker et al. . |
| 5,367,199 | 11/1994 | Lefkowitz et al. . |
| 5,410,333 | * 4/1995 | Conway ............................... 345/168 |
| 5,457,453 | 10/1995 | Chiu et al. ............................... 341/22 |
| 5,502,460 | 3/1996 | Bowen et al. ............................... 345/168 |
| 5,519,569 | 5/1996 | Sellers ............................... 361/680 |
| 5,644,338 | 7/1997 | Bowen ............................... 345/168 |
| 5,661,505 | 8/1997 | Livits . |
| 5,668,574 | * 9/1997 | Huang ............................... 345/167 |
| 5,670,988 | * 9/1997 | Tickle ............................... 345/157 |
| 5,716,274 | * 2/1998 | Goto et al. ............................... 463/37 |
| 5,785,317 | * 7/1998 | Sasaki ............................... 273/148 B |
| 5,818,360 | 10/1998 | Chu et al. . |
| 5,825,612 | * 10/1998 | Aubuchon et al. ............................... 345/168 |
| 5,841,424 | 11/1998 | Kikinis . |
| 5,874,906 | 2/1999 | Willner et al. . |
| 5,880,712 | 3/1999 | Goldman . |
| 5,903,259 | 5/1999 | Brusky et al. . |
| 5,949,643 | 9/1999 | Batio . |
| 5,956,018 | 9/1999 | Pejic et al. . |
| 5,957,595 | * 9/1999 | Chen ............................... 345/163 |
| 5,990,868 | * 11/1999 | Frederick ............................... 345/158 |
| 6,005,767 | 12/1999 | Ku et al. . |

FOREIGN PATENT DOCUMENTS 2 244 546 A  * 12/1991  (GB) ............................... 345/167

* cited by examiner

Primary Examiner—Richard Hjerpe
Assistant Examiner—Alexander Eisen
(74) Attorney, Agent, or Firm—Perkins Coie LLP

(57) ABSTRACT

A method for operating an ergonomic computer keyboard. The keyboard may include a housing with a removable first input device in an upper surface of the housing and a second input device in a lower surface of the housing. Users may generate first and second input signals by manipulating the first and second input devices, respectively. The users may support the keyboard by grasping a projection projecting away from the lower surface of the keyboard housing. The users may also pivot end portions of the keyboard relative to a central portion of the keyboard while manipulating the first and second input devices.

5 Claims, 9 Drawing Sheets

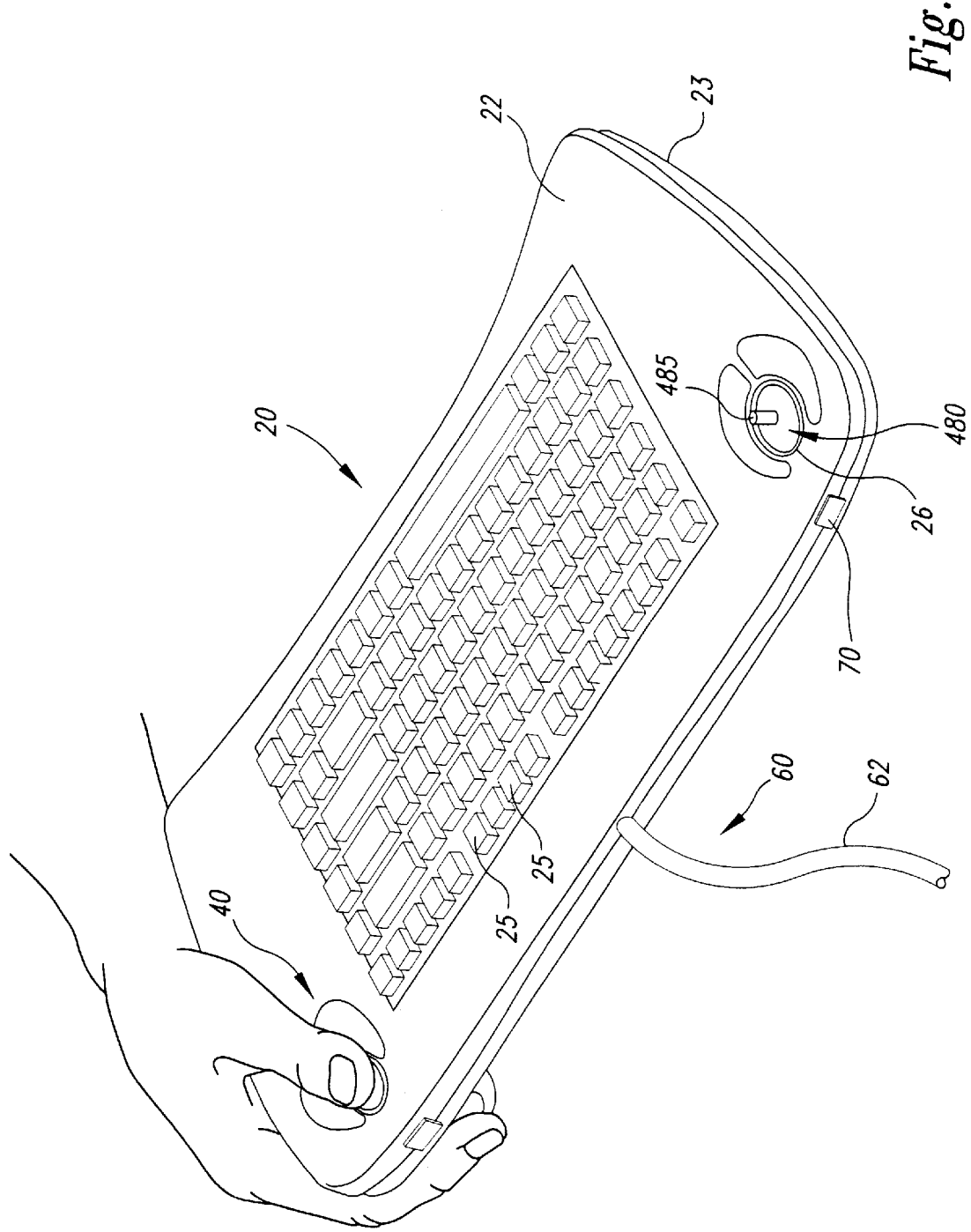

METHOD FOR OPERATING AN ERGONOMIC KEYBOARD

TECHNICAL FIELD

The present invention is directed toward a method for transmitting signals to a computer using an ergonomic keyboard having a plurality of input devices.

BACKGROUND OF THE INVENTION

Personal computers are relatively small computers that may be operated from a desktop or other flat work surface. Conventional personal computers typically include a display on the desktop and a processor coupled to the display. A keyboard is typically coupled to the processor to allow a user to transmit commands to the processor. The keyboard may include alphanumeric input keys, a pointing device, and input buttons associated with the pointing device, all of which may be positioned in a single keyboard housing. The pointing device may include a roller ball, touch pad, joystick, or similar device used to manipulate or move images on the display. The input buttons may be activated by the user to transmit additional commands to the processor in association with the pointing device.

One drawback with conventional keyboards is that it may be difficult for users to access and manipulate both the pointing device and the input buttons while keeping their fingers in an ergonomic and comfortable position. For example, when the pointing device and the input buttons are positioned in an upper surface of the keyboard, users often hold their hands flat and parallel to the upper surface to access the pointing device and the input buttons. It may be tiring or uncomfortable for users to maintain this hand position for an extended period of time.

Another drawback with conventional keyboards is that users may prefer to access both the pointing device and the input buttons with the same fingers. Accordingly, users may inadvertently depress the wrong input button because they often shift their fingers back and forth between the pointing device and the input buttons. Still another drawback is that users may not be able to comfortably manipulate the pointing device and the input buttons simultaneously or in quick succession. As such, many conventional keyboard configurations are particularly disadvantageous for use with computer games or other applications that require quick reaction times.

One conventional approach to making keyboards more comfortable is to couple the keyboard to the display and/or the processor with a wireless link for allowing users to move the keyboard more freely relative to the display. For example, the users may rest the keyboard on their laps while manipulating the pointing device and the input buttons. One drawback with this keyboard is that it may be difficult to manipulate the alphanumeric keys, the pointing device and/ or the input buttons with such laptop keyboards. Additionally, users may inadvertently upset laptop keyboards from their laps.

SUMMARY OF THE INVENTION

The present invention is directed toward methods for transmitting signals from a computer keyboard to a computer. In one embodiment, the method includes generating a first signal by manipulating a first input device proximate to the upper surface of the keyboard with a first human digit and generating a second signal by manipulating a second input device proximate to the lower surface of the keyboard with a second human digit. The method may further include grasping the keyboard between the first and second digits. For example, the method may include grasping a projection that extends away from the lower surface of the keyboard. Alternatively, the method may include supporting a concave lower surface of the keyboard.

In another embodiment of the invention, the keyboard may be elongated along a first axis and may have a first portion and a second portion coupled to the first portion and rotatable relative to the first portion. The method may include rotating the second portion of the keyboard relative to the first portion of the keyboard about a second axis that is generally parallel to the first axis. The method may further include manipulating an input device coupled to the second portion of the keyboard, either simultaneously or sequentially with rotating the second portion of the keyboard relative to the first portion of the keyboard.

BRIEF DESCRIPTION OF THE DRAWINGS

FIG. 6A is a top isometric view of a keyboard having a removable touch-sensitive projection and that operates in accordance with another embodiment of the invention.

DETAILED DESCRIPTION OF THE INVENTION

The present invention is directed toward methods for operating keyboards for personal computers. In one embodiment, users may operate input buttons and/or pointing devices positioned in a lower surface of the keyboard housing. In another embodiment, users may rotate one portion of the keyboard relative to another concurrently or sequentially with manipulating the input buttons and/or pointing devices. Many specific details of certain embodiments of the invention are set forth in the following description and in FIGS. 1–8 to provide a thorough understanding of such embodiments. One skilled in the art, however, will understand that the present invention may have additional embodiments that may be practiced without several of the details described in the following description.

Figure 1:
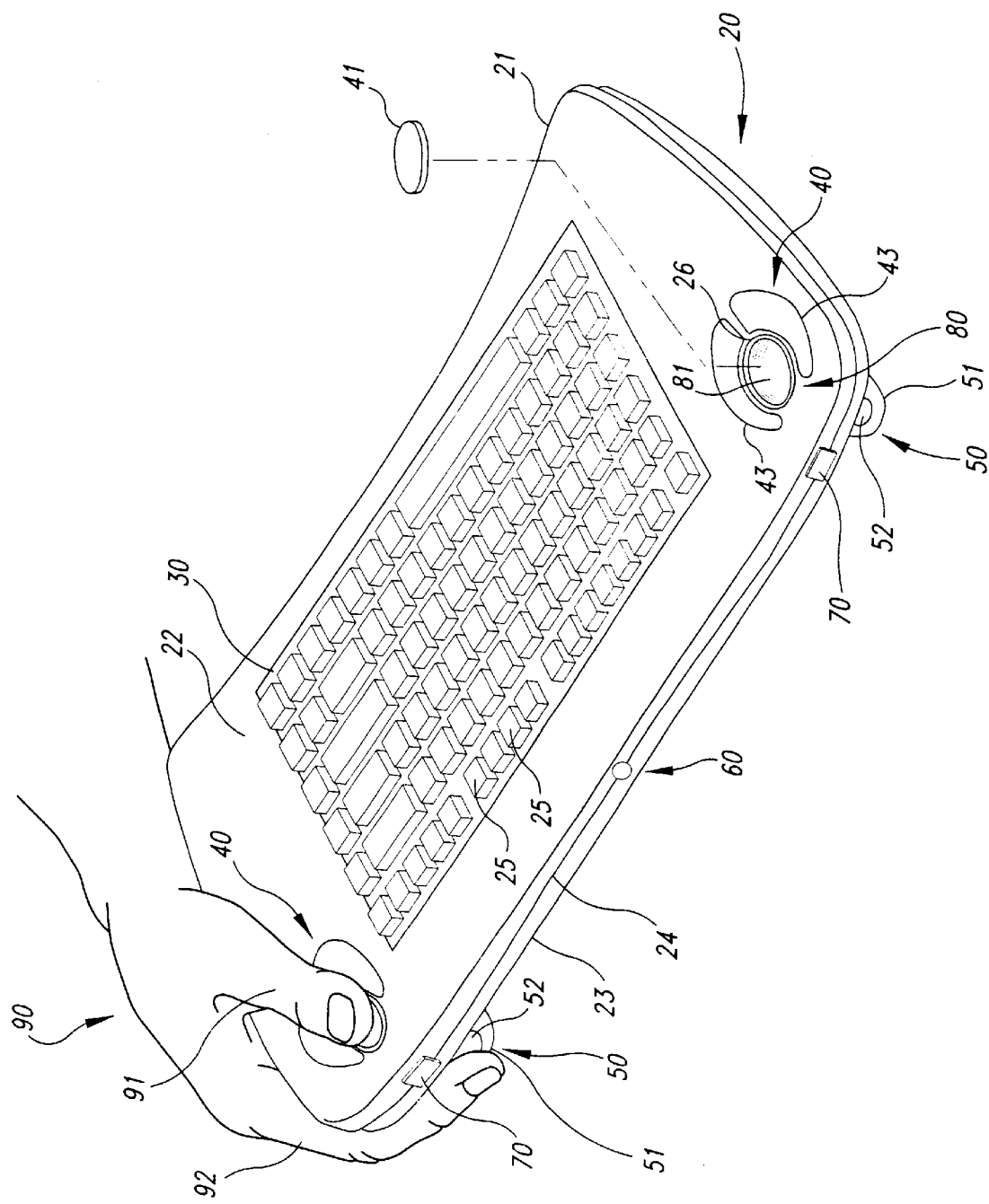
FIG. 1 is a top isometric view of a keyboard that operates in accordance with an embodiment of the invention.

FIG. 1 is a top isometric view of a keyboard 20 that can be grasped in a user's hands 90 (one of which is shown in FIG. 1). The keyboard 20 can include first input devices 40 in an upper surface and second input devices 50 in a lower surface that the user may activate while grasping and supporting the keyboard 20. The keyboard 20 can also have communication link 60 to transmit signals generated by the input devices 40 and 50.

In the particular embodiment shown in FIG. 1, the keyboard 20 includes a housing 21 having an upper surface 22, a lower surface 23 opposite and generally parallel to the upper surface 22, and an edge surface 24 between the upper and lower surfaces 22, 23. A plurality of input keys 25, such as alphanumeric keys and/or function keys, project through a key opening 30 in the upper surface 22. The input keys 25 can be configured in a conventional arrangement to be operated in a conventional manner.

The keyboard 20 can further include at least one first input device 40 received in the upper surface 22 of the housing 21. In the particular embodiment shown in FIG. 1, the keyboard 20 includes two first input devices 40. Each first input device 40 generally has one or more input buttons 43 and a pointing device 80. The input buttons 43 can be activated by depressing them relative to the housing upper surface 22 in a conventional manner. The pointing device 80 can have a sphere 81 rotatable relative to the housing 21 to generate command signals, or, as is discussed below with reference to FIGS. 6A–6D, the pointing device 80 may include other elements. Users activate the pointing device 80 and the input buttons 43 with their thumbs 91 or fingers 92.

One aspect of the embodiment of the keyboard 20 shown in FIG. 1 is that the pointing device 80 can be detached from the keyboard housing 21. More specifically, the pointing device 80 can be removably received in an aperture 26 of the housing upper surface 22. In another embodiment, the entire first input device 40, including the pointing device 80 and the input buttons 43, can be received as a unit in the aperture 26. In either case, the aperture 26 may be covered with a cap 41 to prevent damage to the aperture 26 when the pointing device 80 and/or the input buttons 43 are removed from the keyboard 21. Although the first input devices 40 are generally similar, as shown in FIG. 1, the left and right first input devices 40 may be arranged differently from one another. For example, the pointing device 80 and input buttons 43 of the right input device 40 may be arranged to be more comfortable for right-handed operation, and the pointing device 80 and input buttons 43 of the left input device 40 may be arranged to be more comfortable for left-handed operation.

The keyboard 20 can also include two projections 51 projecting downward away from the lower surface 23 at opposite ends of the housing 21. Each projection 51 can house a second input device 50. In one embodiment, each second input device 50 has an input switch 52 in an opening through the corresponding projection 51. Each input switch 52 can have a concave surface to receive one of the user's fingers 92 and to align a tip of the user's finger with the input switch. To activate the input switch 52, it is moved toward a front edge of the keyboard 20.

In another embodiment, the keyboard 20 can include a pair of third input devices 70 positioned at opposite ends of the intermediate surface 24 of the keyboard housing 21. The third input devices 70, for example, can be input buttons that may be depressed relative to the intermediate surface 24 in a conventional manner to generate command signals.

In operation, signals generated by operating the first, second and/or third input devices 40, 50, 70 are sent to a processor for manipulating a computer. For example, the command signals generated by the third input devices 70, the second input devices 50, and the first input devices 40 may be transmitted to the communication link 60. The communication link 60 then sends the signals to other components, as discussed in more detail below.

Figure 2:
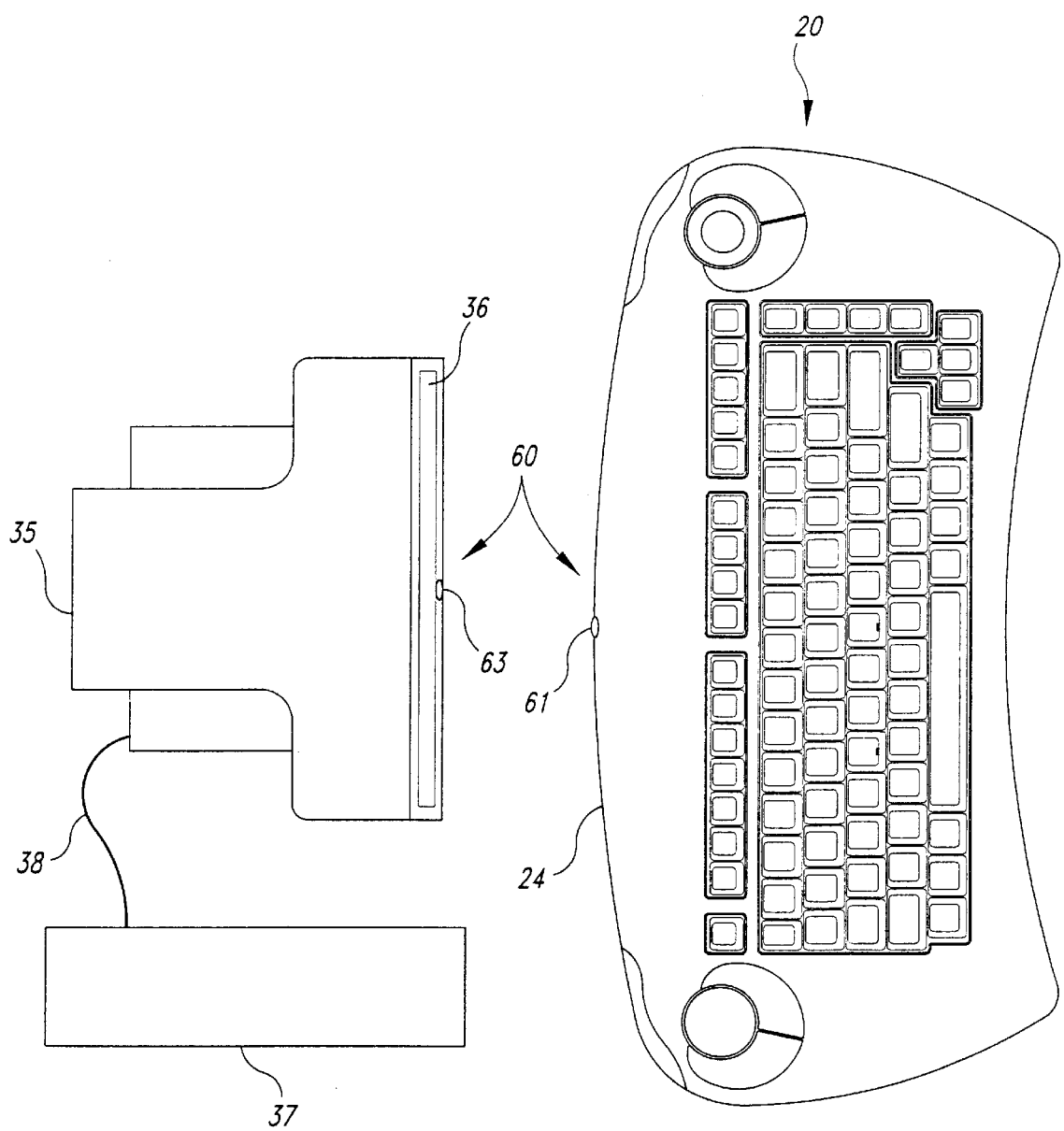
FIG. 2 is a top plan view of the keyboard of FIG. 1 coupled to a display with a communication link in accordance with an embodiment of the invention.

FIG. 2 is a top plan view of the keyboard 20 shown in FIG. 1 positioned proximate to a processor 37 and a monitor 35. The monitor 35 may have a display 36, such as a CRT or a liquid crystal display. The communication link 60 operatively couples the keyboard 20 to the monitor 35 and/or the processor 37 to transmit signals to and/or from the keyboard 20. In one embodiment, the communication link 60 has a transmitting transducer 61 in the intermediate surface 24 of the keyboard housing 21 and a receiving transducer 63 in the monitor 35. The communication link 60 may also have a cable 38 between the monitor 35 and the processor 37. The communication link 60 may accordingly transmit signals between the keyboard 20, the monitor 35 and the processor 37 to manipulate the position and/or other characteristics of images on the display 36.

In one embodiment, the transmitting transducer 61 and the receiving transducer 63 may transmit and receive, respectively, infrared signals. In another embodiment, the transmitting transducer 61 and the receiving transducer 63 may transmit and receive, respectively, radio signals. In still another embodiment, the receiving transducer 63 may be housed in the processor 37 or other portions of the computer in a manner in which it can receive signals from the transmitting transducer 61. Similarly, the transmitting transducer 61 may be positioned in any portion of the keyboard 20 from which it can send signals to the receiving transducer 63. The keyboard 20 may also include a plurality of transmitting transducers 61.

Operation of an embodiment of the keyboard 20 is best understood with reference to FIG. 1. Users may grasp the keyboard 20 with one or two hands 90 by positioning their thumbs 91 proximate to the upper surface 22 of the housing 21 and their fingers 92 proximate to the lower surface 23. Users generally engage the lower surface 23 with their index fingers, as shown in FIG. 1, but one or more other fingers may be used for gripping the lower surface 23. By gripping both the upper and lower surfaces 22 and 23, users may support the keyboard 20 in a stable position while manipulating the input devices 40, 50, and 70.

In one method of operation, users manipulate one or both of the first input devices 40 while simultaneously manipulating one or both of the second input devices 50 and/or one or both of the third input devices 70. For example, the users may manipulate one of the pointing devices 80 to control the location of an image on the display 36 (FIG. 2) relative to two orthogonal axes while using the other pointing device 80 to control the location of the image relative to a third orthogonal axis. At the same time, the user may manipulate the second input devices 50 to control yet another characteristic of the image. As a further example, when the keyboard 20 is used to control a computer game, the second input devices 50 may simulate a gun trigger or similar device, or they may be used to control any of a myriad of characteristics of the image.

In an alternate method of operation, users may operate only a single pointing device 80 in combination with one or both of the second input devices 50 and/or the input buttons 43. The other pointing device 80 may be replaced with the cap 41. In still another method of operation, users may manipulate the third input devices 70 by moving their fingers 92 from the second input devices 50 to the third input devices 70. Accordingly, the ends of the intermediate surface 24, the upper surface 22, and the lower surface 23 of the housing 21 may be rounded at their respective opposite ends to allow users to easily move their fingers 92 back and forth between the second input devices 50 and the third input devices 70. In still further embodiments, the input devices 40, 50, and 70 may be used singly or in any number of other combinations to control functions of the processor 37 and/or the display 36 (FIG. 2).

An advantage of the particular embodiment of the keyboard 20 shown in FIGS. 1–2 is that users may operate the input devices 40, 50, and 70 while grasping both the upper and lower surfaces 22 and 23 of the keyboard 20 comfortably with both hands 90. Additionally, users also rotate their wrists so that their hands face each other for operating the input devices. This position may be more comfortable than conventional positions because the users' wrists may naturally tend to rotate so that the palms of their hands are juxtaposed with each other across the computer. Conversely, users may have to rotate their hands to a less natural position, e.g., with their wrists facing downward, when they use conventional keyboards having input devices that are accessible only from the upper surface. Furthermore, it may be easier for users to manipulate the input device 40 and the input button 43 when the wrists of each hand face each other. For example, it may be easier for users to depress the input buttons 43 with their thumbs by pivoting their thumbs downwardly toward their index fingers while their wrists face each other, rather than pivoting their thumbs away from their index fingers while their wrists face downward, as may be the case when users operate conventional keyboards.

Another advantage of the particular keyboard 20 shown in FIGS. 1 and 2 is that users may simultaneously manipulate more than one input device. For example, users may simultaneously manipulate both the first and second input devices 40, 50, and/or they may simultaneously manipulate virtually any combination of one or both of the first input devices 40, second input devices 50, and third input devices 70. Yet a further advantage of the keyboard 20 shown in FIG. 1 is that the first input devices 40 may be removable so that a single keyboard can be comfortably used by a variety of users. For example, a single keyboard 20 and a single first input device 40 may be used by both right- and left-handed users by moving the first input device 40 from one aperture 26 to the other according to the user's preferences.

Figure 3:
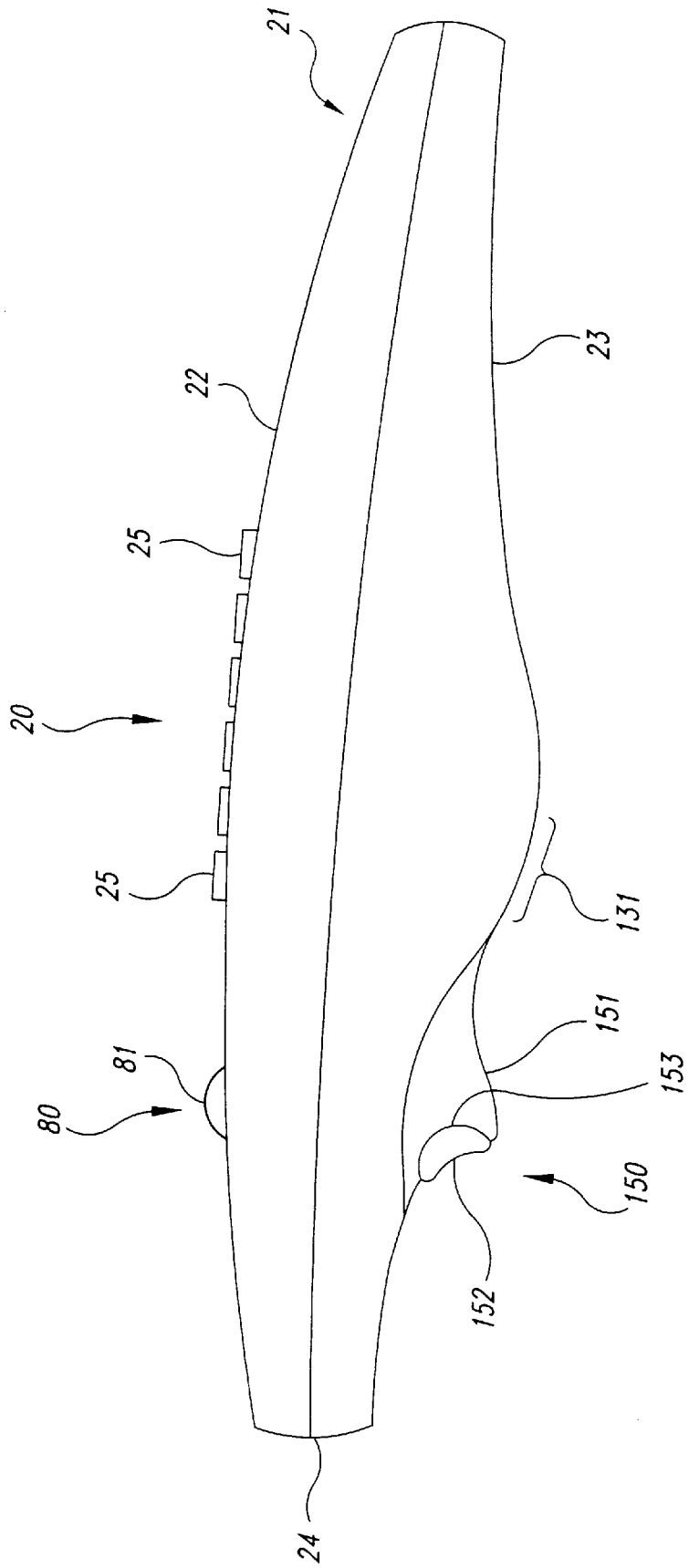
FIG. 3 is a side elevation view of a keyboard having an input button in a lower surface and that operates in accordance with another embodiment of the invention.

FIG. 3 is a side elevation view of a keyboard 20 having a second input device 150 in accordance with another embodiment of the invention. In this embodiment, the second input device 150 has an input switch 152 housed in a projection 151. The surface of the input switch 152 can have a saddle shape to comfortably receive one of the user's fingers 92 (FIG. 1). Additionally, an aperture 153 in the projection 151 through which the input switch 152 projects can be scarfed back adjacent the input switch 152 to allow the users to wrap their fingers 92 around the input switch 152. This arrangement may allow users to maintain greater control over both the input switch 152 and the keyboard 20 because the users may engage a greater portion of their fingers with the input switch 152.

The lower surface 23 of the keyboard housing 21 shown in FIG. 3 can also include a contoured support surface 131 adjacent the projection 151. The support surface 131 can be concave for engaging the fingers 92 (FIG. 1) of a user that are not engaged with the input switch 152. Users may accordingly grasp a greater portion of the keyboard 20, further reducing the likelihood that the keyboard will dislodge from their grip. Users may also exert a force on the contoured support surface 131 that is at least partly in the plane of the keyboard 20, and that is directed toward the users, to restrict motion of the keyboard 20 away from the users.

Figure 4:
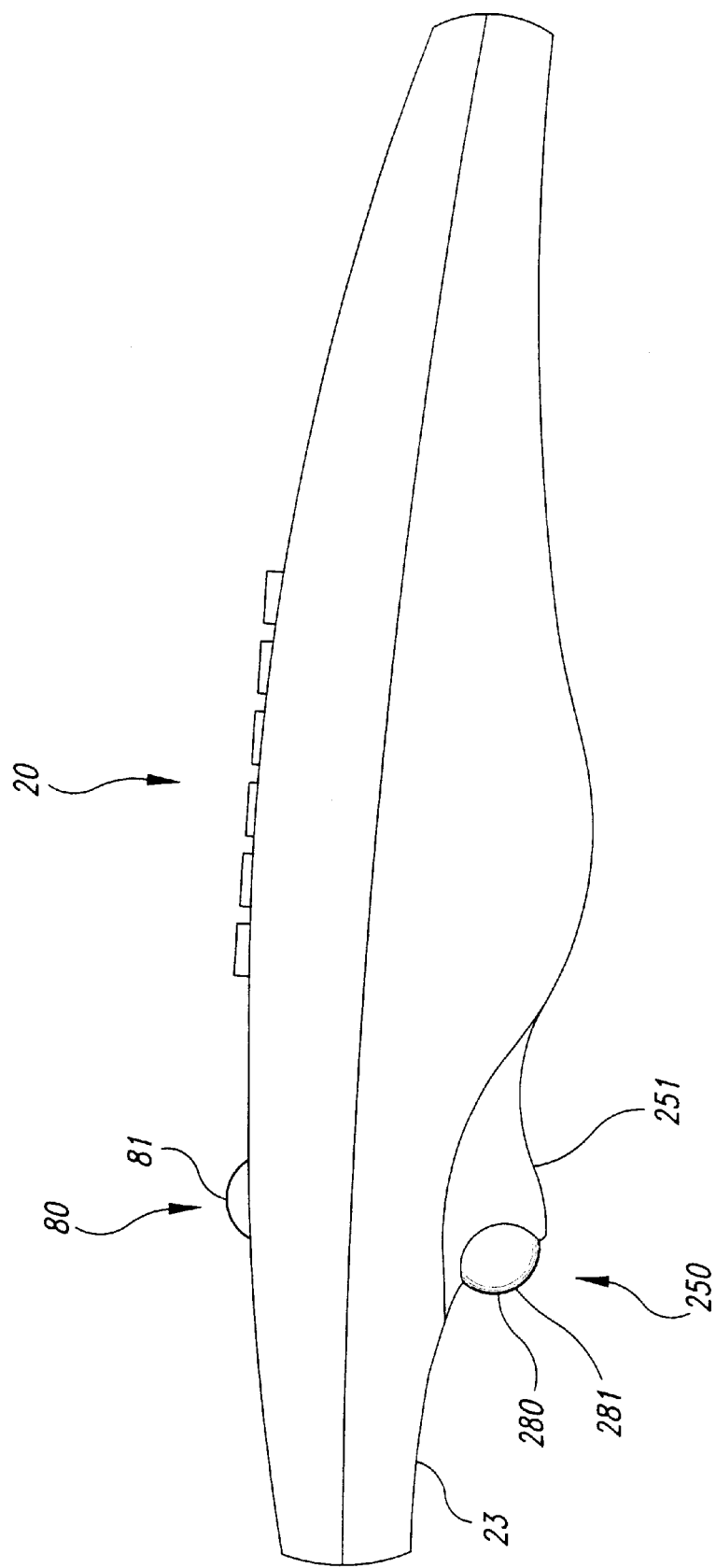
FIG. 4 is a side elevation view of a keyboard having a pointing device in a lower surface and that operates in accordance with still another embodiment of the invention.

FIG. 4 is a side elevation view of a keyboard 20 having two projections 251 (one of which is visible in FIG. 4) in accordance with another embodiment of the invention. Each projection 251 extends from the lower surface 23 and accommodates a second input device 250. As shown in FIG. 4, each second input device 250 can have a pointing device 280, such as a sphere 281 that can rotate relative to the projection 251. Accordingly, each second input device 250 may control more characteristics of an image on the display 36 (FIG. 2) than does the two-position input switch 52 shown in FIG. 1. For example, the second input device 250 may be used to control the location of an image in two orthogonal directions. Furthermore, the second input device 250 may be used to more precisely control the value of any one characteristic than does the input switch 52.

Figure 5:
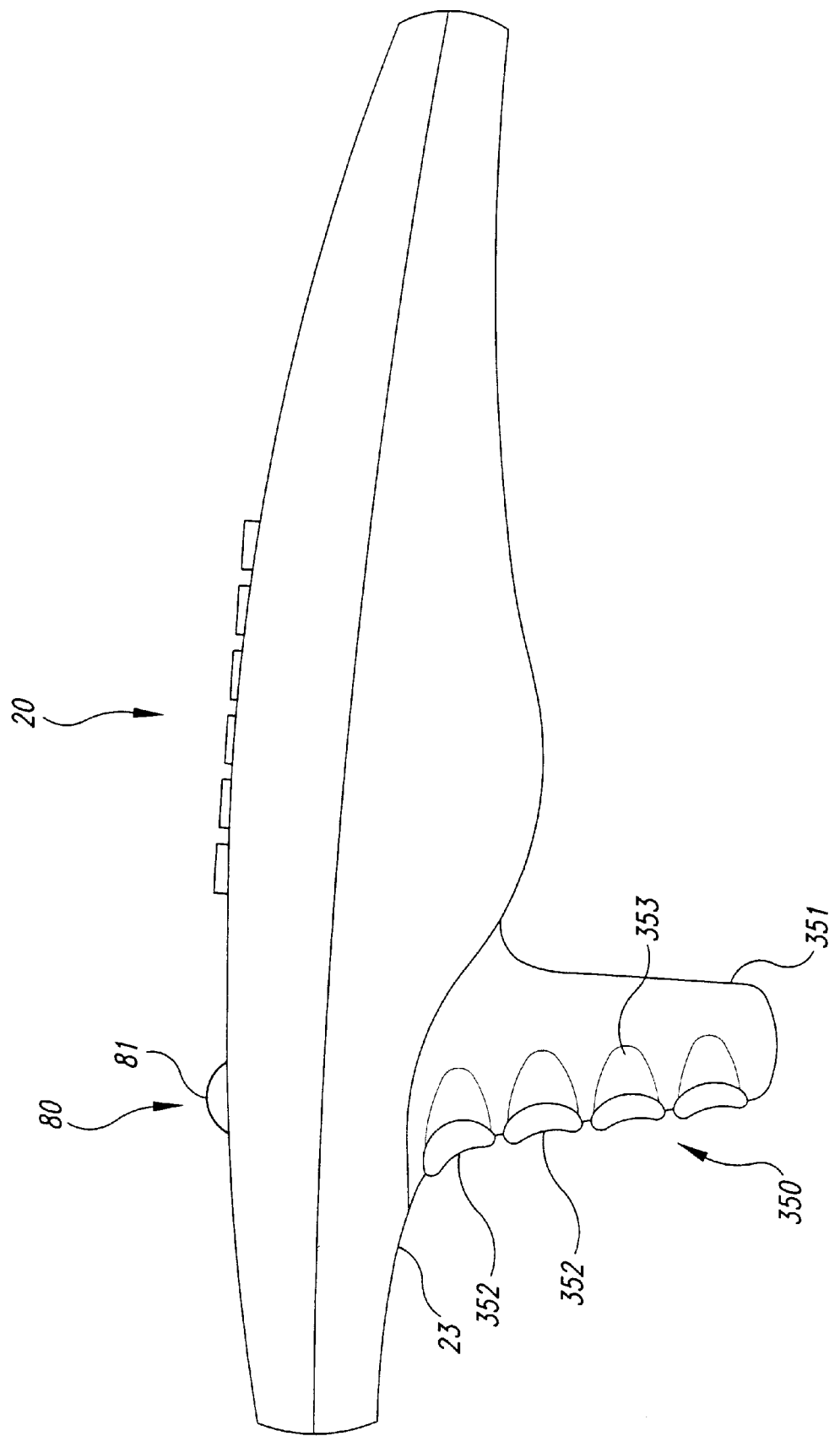
FIG. 5 is a side elevation view of a keyboard having an elongated handle depending from a lower surface and that operates in accordance with yet another embodiment of the invention.

FIG. 5 is a side elevation view of a keyboard 20 having two elongated projections 351 (one of which is visible in FIG. 5) extending away from the lower surface 23 of the housing 21. Each elongated projection 351 can house a second input device 350 that includes a plurality of input switches 352 arranged one above the other so that they may be easily gripped by the user's fingers 92 (FIG. 1). In one embodiment, each projection 351 has four input switches 352 corresponding to each finger 92 of one of the user's hands 90 (FIG. 1). In other embodiments, each projection 351 can have more or fewer than four input switches 352. The elongated projections 351 can also include indentations 353 proximate to each input switch 352 to receive the user's fingers 92 as they wrap over the input switches. Accordingly, the elongated projections 351 may provide the user with increased control over the keyboard 20 because users may grasp the keyboard in a comfortable position with several fingers. Furthermore, the users may transmit a greater number of command signals by manipulating all four input switches 352 of each second input device 350, either simultaneously or sequentially.

FIG. 6A is a top isometric view of a keyboard 20 having a communication link 60 in accordance with another embodiment of the invention. In this embodiment, the communication link is a cable 62 coupled between the keyboard 20 and the processor 37 (FIG. 2) or the monitor 35 (FIG. 2) in a conventional manner. As shown in FIG. 6A, the keyboard 20 can have a pointing device 480 with a fixed projection 485 coupled to a transducer (not shown) that detects pressure on the fixed projection 485 and converts the pressure to command signals. The command signals may be then transmitted over the cable 62 to the processor 37. Alternatively, the command signals may be transmitted over a wireless communication link, as shown in FIGS. 1 and 2.

Figure 6B:
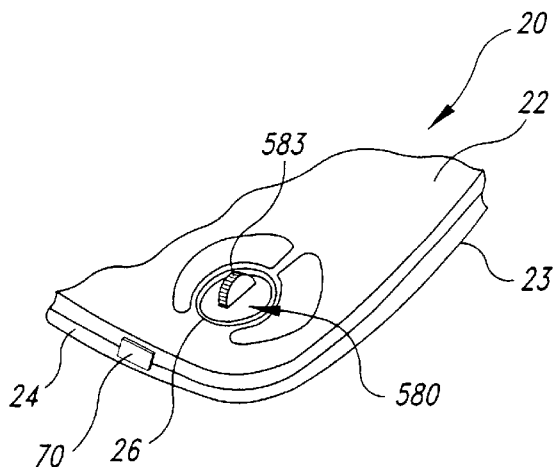
FIG. 6B is a top isometric view of a portion of a keyboard having a removable thumbwheel and that operates in accordance with still another embodiment of the invention.
Figure 6C:
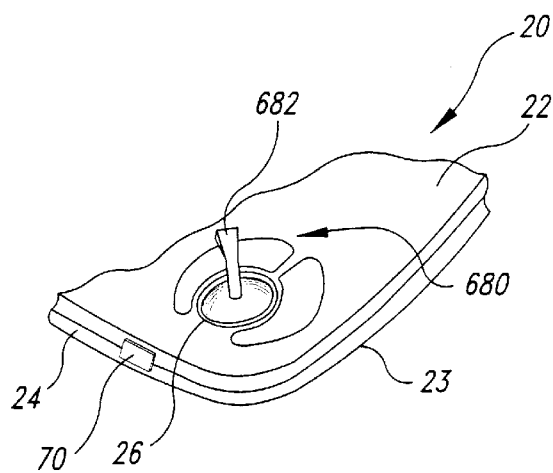
FIG. 6C is a top isometric view of a portion of a keyboard having a removable joystick and that operates in accordance with yet another embodiment of the invention.
Figure 6D:
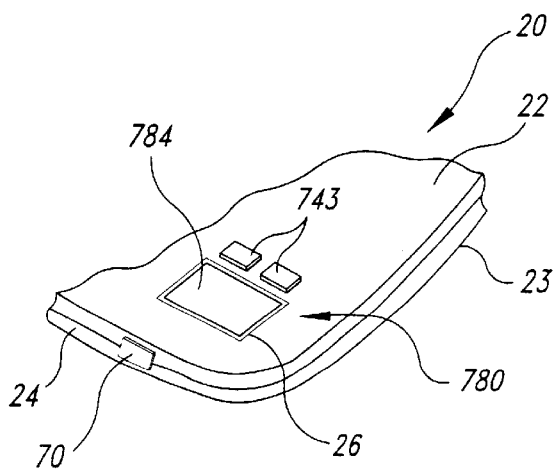
FIG. 6D is a top isometric view of a portion of a keyboard having a removable touchpad and that operates in accordance with still another embodiment of the invention.

FIGS. 6B–6D are top isometric views of portions of keyboards 20 having a variety of other pointing devices in accordance with other embodiments of the invention. Any of the pointing devices shown in FIGS. 6A–6D can be included in the first input devices 40, the second input devices 50, and/or the third input devices 70. FIG. 6B, for example, shows a pointing device 580 with a thumbwheel 583 that can be rotated in a single plane relative to the keyboard 20.

Alternatively, as shown in FIG. 6C, the keyboard 20 may include a pointing device 680 having a joystick 682 that may be pivoted relative to the keyboard 20 in a conventional manner. FIG. 6D illustrates still another embodiment in which the keyboard 20 has a pointing device 780 with a touchpad 784 and input buttons 743. The touchpad 784 is sensitive to contact and may be used to manipulate images on the monitor 35 (FIG. 2) as users move their fingers across the surface of the touchpad 784.

Figure 7:
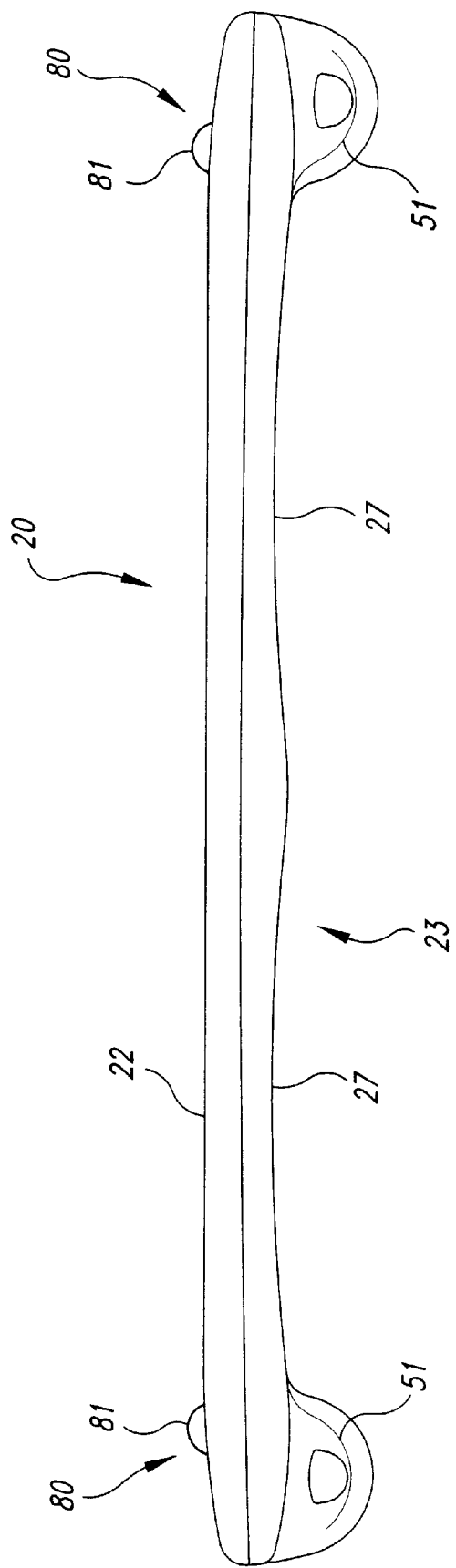
FIG. 7 is a rear elevation view of a keyboard having a contoured lower surface and that operates in accordance with another embodiment of the invention.

FIG. 7 is a rear elevation view of another keyboard 20 having a lower surface 23 that is contoured in accordance with another embodiment of the invention. As shown in FIG. 7, the lower surface 23 includes two depressions 27 that may be sized and shaped to fit comfortably over the user's legs (not shown). Accordingly, the keyboard 20 may fit comfortably on the user's lap. The projections 51 extending downwardly from the lower surface 23 may engage the sides of the user's legs to restrict motion of the keyboard 20 relative to the user's lap, and/or prevent users from inadvertently displacing the keyboard 20 from their laps.

Figure 8:
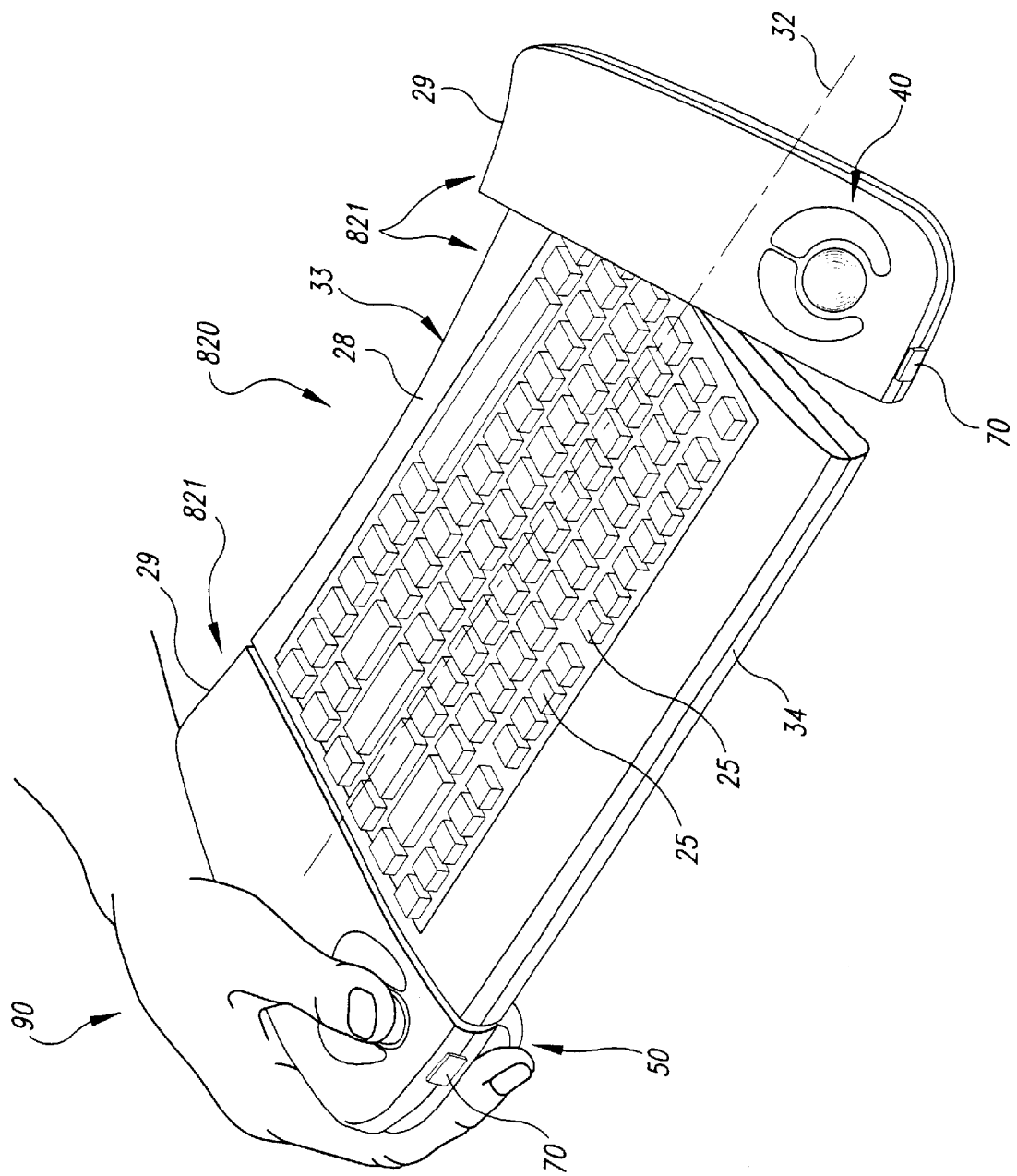
FIG. 8 is a top isometric view of a keyboard having end portions that are pivotable relative to a central portion and operate in accordance with yet another embodiment of the invention.

FIG. 8 is a top isometric view of another keyboard 820 having a housing 821 with end portions 29 that are movably coupled to a central portion 28. The end portions 29 can pivot relative to the central portion 28 about an axis 32 that is generally in the plane of the housing 821, and/or the input keys 25. For example, the axis 32 may be aligned with a forward edge 33 of the keyboard 820 (facing toward the user) and/or a rear edge 34 (facing away from the user). Alternatively, the axis 32 may be aligned with one or more of the transverse rows of input keys 25. In operation, users may rotate either or both of the end portions 29 clockwise or counterclockwise relative to the central portion 28. The users may also manipulate the first, second, and third input devices 40, 50, and 70 in a manner generally similar to that discussed above with reference to FIG. 1. In one embodiment, a pivot joint between the end portions 29 and the central portion 28 may be loose enough to allow the end portions 29 to be easily rotated, yet stiff enough to keep the end portions in position once they are released by the user. In another embodiment, the keyboard 820 may include releasable locks to secure the end portions 29 in position relative to the central portion 28.

An advantage of the keyboard 820 is that users may move the input devices 40, 50, and 70 to any of a wide range of comfortable positions. For example, the central portion 28 may be wide enough to span the user's legs so that the users may place the central portion 28 flat on their laps while at the same time rotating the end portions 29 either upwardly or downwardly adjacent their legs. Alternatively, the users may hold the keyboard 820 while standing, and may rotate the end portions 29 as they manipulate the input devices 40, 50, and 70.

From the foregoing it will be appreciated that, although specific embodiments of the invention have been described herein for purposes of illustration, various modifications may be made without deviating from the spirit and scope of the invention. For example, the second input devices 50 need not be positioned in a portion of the housing 21 that extends away from a generally flat lower surface 23, but alternatively may be positioned directly on the lower surface. The second input devices 50 may be flush mounted or slightly recessed in the lower surface 23 so as to be accessible to users without being inadvertently activated whenever the keyboard 20 is placed on a support surface. Accordingly, the invention is not limited except as by the appended claims.

What is claimed is:

1. A method for transmitting signals from a computer keyboard to a computer, the keyboard having a first axis, the method comprising:

supporting a first portion of the keyboard with a first hand of a user and supporting a second portion of the keyboard with a second hand of the user, an intermediate portion of the keyboard being positioned between the first and second portions, the first axis extending transversely from the first hand of the user to the second hand of the user;

rotating the second portion of the keyboard relative to the intermediate portion of the keyboard about a second axis generally parallel to the first axis;

rotating the first portion of the keyboard relative to the intermediate portion of the keyboard about a third axis generally parallel to the first axis;

manipulating an input device coupled to the second portion of the keyboard to generate a signal; and transmitting the signal to the computer.

2. The method of claim 1, further comprising grasping the second portion of the keyboard.

3. The method of claim 1 wherein the act of manipulating the input device is concurrent with the act of rotating the second portion of the keyboard.

4. The method of claim 1 wherein the input device includes an input button movable relative to a housing of the keyboard and the act of manipulating the input device includes moving the input button relative to the housing.

5. The method of claim 1 wherein the input device includes a pointing device and the act of manipulating the input device includes manipulating the pointing device.

\* \* \* \* \*

UNITED STATES PATENT AND TRADEMARK OFFICE
CERTIFICATE OF CORRECTION

PATENT NO. : 6,288,706 B1
DATED : September 11, 2001
INVENTOR(S) : Leman

It is certified that error appears in the above-identified patent and that said Letters Patent is hereby corrected as shown below:

Title page,
Item [56], References Cited, OTHER PUBLICATIONS,
Insert -- RCA Remote Model Number RTB100, Top Isometric View --;
Insert -- RCA Remote Model Number RTB100, Bottom Isometric View --;
Insert -- SONY Playstation, Top Isometric View --;
Insert -- Sejin Electron Inc., SWK-5697WT, Top Isometric View --;
Insert -- Sejin Electron Inc., SWK-5697WT, Bottom Isometric View --;

Signed and Sealed this

Eighth Day of October, 2002

*Attest:*

*Attesting Officer*

JAMES E. ROGAN
*Director of the United States Patent and Trademark Office*